No. 863,428. PATENTED AUG. 13, 1907.
J. P. NIKONOW.
VENTILATOR.
APPLICATION FILED AUG. 22, 1906.
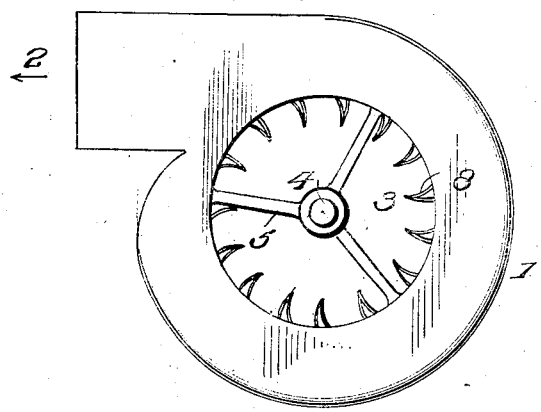
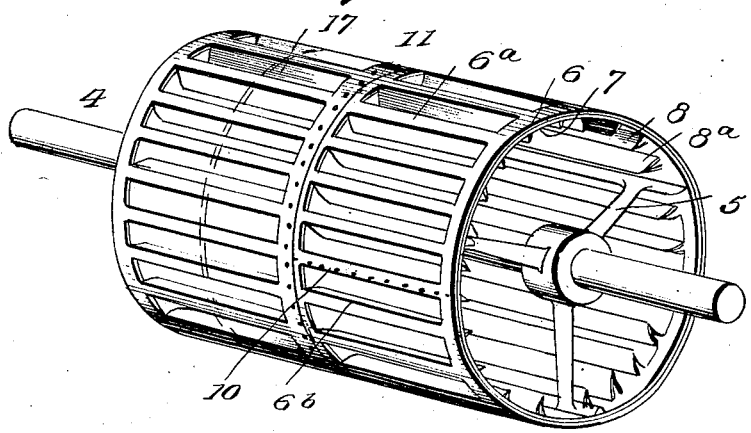
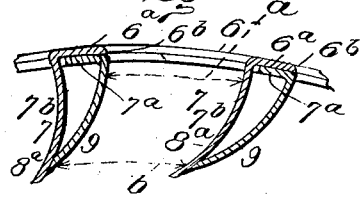

UNITED STATES PATENT OFFICE.

JOHN P. NIKONOW, OF PITTSBURG, PENNSYLVANIA.

VENTILATOR.

No. 863,428.　　　　Specification of Letters Patent.　　　　Patented Aug. 13, 1907.

Application filed August 22, 1906. Serial No. 331,651.

*To all whom it may concern:*

Be it known that I, JOHN P. NIKONOW, a subject of the Czar of Russia, residing at Pittsburg, in the county of Allegheny and State of Pennsylvania, have invented certain new and useful Improvements in Ventilators, of which the following is a specification.

For a full description of the invention and the merits thereof and also to acquire a knowledge of the details of construction of the means for effecting the result, reference is to be had to the following description and accompanying drawings, in which:

Figure 1 is a side elevation of one embodiment of my invention. Fig. 2 is a view illustrating the revoluble element of the device for producing the air currents. Fig. 3 is an enlarged detail sectional view through the shell and the fan blade members of the said revoluble element.

Corresponding and like parts are referred to in the following description and indicated in all the views of the drawings by the same reference characters.

Referring to the drawing, the numeral 1 designates the casing, which may be of any desired design and construction and which is intended to receive the revoluble draft producing element which is the important feature of the invention. Said casing may be provided with openings 2 and 3 constituting air outlets and inlets.

4 designates the shaft for the revoluble element, said shaft being intended to be driven by any suitable source of power and having one or more spiders 5 thereon, as illustrated.

The main feature of my invention resides in the construction and operation of the parts forming the revoluble element of the device and particularly the blade members of the same. As illustrated in the drawing, said element comprises concentric and overlapping shells 6 and 7, preferably cylindrical, and secured in any desired manner to the spider 5 on the shaft 4 so as to revolve as the shaft rotates. As illustrated best in Fig. 3 the outer shell 6 is provided with a series of transverse bars 6$^a$ which result from cutting the metal along certain lines and bending portions of it inwardly, said bars being provided with one edge which I shall for the purposes of description call the cutting edge designated 6$^b$. The opposite edge of each bar 6$^a$ is integrally formed with a blade member 8 which emanates from such opposite edge and extends inwardly with a reverse curve as shown so that its outermost face is concave, as designated at 8$^a$. The innermost shell 7 is also formed with transverse bars 7$^a$ whose cut edges 7$^b$ are on the opposite side of the bar from the cut edges 6$^b$ of the outermost shell 6. It will therefore be seen that the two bars overlap each other but extend in opposite directions from their cut edges. The blade members 9 for the innermost shell are curved from the opposite edges of the bars 7$^a$ and extend inwardly to meet the blade members 8 near the lower ends of both blade members. The outer and rear faces of the blade members 9 are convex, as shown. The two bars 6$^a$ and 7$^a$ are brazed together as are the lower portions of the blade members 8 and 9, and by this means a very firm structure is provided, while at the same time the blades constituted by the two blade members 8 and 9 are hollow and consequently light. An important feature of advantage resulting from this construction just described is in the fact that as illustrated in Fig. 3, the air passages formed by the spaced-apart blades are perfectly smooth and are of uniform area and curvature throughout, as designated by the lines $a$ and $b$ at the outlet and inlet ends of said passages. Hence, the air will have no chance to expand and thereby lose its accelerating force.

Preferably in the manufacture of a blast fan embodying the improved revoluble element of my invention, the latter is constructed by stamping the blade members from sheet metal strips and bending them to the required cylindrical form and riveting them at their ends, as indicated at 10. It is manifest that two or more shells may be placed side by side to produce a device of desired width and may be riveted together as indicated at 11 in Fig. 2. If desired, especially with comparatively long blades, binding strips of wire or the like, as indicated at 17, may encircle the blades and be secured to the said shells.

From the foregoing description in connection with the accompanying drawings, it will be seen that I have provided an improved construction of mechanically operated ventilator in which the revoluble fan blades are of such a form and construction that the air will come in and go out without any appreciable shock and in which the area for the air remains permanent so that the air will not expand and lose its acceleration during its passage between the blades. In addition to this it is manifest that the invention results in economies of manufacture, as the revoluble element, or at least the shells and blade members thereof, may be readily constructed of sheet metal, the blade members being punched therefrom and the parts being easily shaped by suitable machinery.

Having thus described the invention, what is claimed as new is:

1. A revoluble element for ventilators of the character described, consisting of inner and outer overlapping shells, the outer shell being provided with transverse bars and with reversely curved and inwardly extending blades extending from and integral with the transverse bars at the edge opposite the cut edge thereof, the inner shell being also provided with transverse bars in which the bars extend from the cut edges in a direction opposite to the first named bars, and said inner shell being also provided with integral blade members extending over those edges of the said bars that are opposite the cut edges thereof, and extending downwardly towards the first named blade members and in contact therewith, the outer face of the first named blade members being concave and the rear face of the last named blade members being convex, and means for securing said blade members together, thereby constituting a hollow blade.

2. A revoluble element for ventilators of the class described consisting of inner and outer overlapping shells, the outer shell being provided with transverse bars and with reversely curved and inwardly extending blade members extending from and integral with the transverse bars at the edge opposite the cut edge thereof, the inner shell being also provided with transverse bars in which the bars extend from the cut edges in a direction opposite to the first named bars, and said inner shell being also provided with integral blade members extending over those edges of the said bars that are opposite the cut edges thereof, and extending downwardly towards the first named blade members and in contact therewith, the outer face of the first named blade members being concave and the rear face of the last named blade members being convex, the two sets of bars being secured together by brazing and the blade members being connected together by brazing where they join near their inner ends.

In testimony whereof I affix my signature in presence of two witnesses.

JOHN P. NIKONOW. [L. S.]

Witnesses:
BIRNEY HINES,
ELMER E. LITTLE.